United States Patent [19]

Chan et al.

[11] Patent Number: 5,360,840
[45] Date of Patent: Nov. 1, 1994

[54] EPOXY RESIN COMPOSITIONS WITH IMPROVED STORAGE STABILITY

[75] Inventors: Anita N. Chan; Brian J. Swetlin; Samuel A. Thompson, III, all of Wilmington, Del.; Chester R. Willis, Kennett Square, Pa.; Andrew B. Woodside, Pickerington, Ohio

[73] Assignee: Hercules Incorporated, Wilmington, Del.

[21] Appl. No.: 997,803

[22] Filed: Dec. 29, 1992

[51] Int. Cl.⁵ .................. C08G 59/50; C08L 63/00; C08L 77/10; C08K 3/20; C08K 3/34; C08K 3/36; C08K 3/40

[52] U.S. Cl. .................. 523/428; 523/429; 523/457; 523/466; 523/468; 525/423; 525/523; 525/524

[58] Field of Search ............... 523/428, 429, 468, 457, 523/466; 525/523, 524, 423

[56] References Cited

U.S. PATENT DOCUMENTS

| | | | |
|---|---|---|---|
| 2,684,372 | 7/1954 | Amstutz | 260/328 |
| 3,676,200 | 7/1972 | Rembold et al. | 117/121 |
| 4,330,659 | 5/1982 | King et al. | 528/99 |
| 4,500,582 | 2/1985 | King et al. | 428/116 |
| 4,656,207 | 4/1987 | Jabloner et al. | 523/400 |
| 4,656,208 | 4/1987 | Chu et al. | 523/400 |
| 4,684,678 | 8/1987 | Schultz | 523/468 |
| 4,855,386 | 8/1989 | Bauer | 523/468 |
| 4,861,810 | 8/1989 | Dewhirst | 523/468 |
| 4,863,787 | 9/1989 | Gawin | 428/240 |
| 4,866,133 | 9/1989 | Andrews et al. | 525/109 |
| 4,933,392 | 6/1990 | Andrews et al. | 525/110 |
| 4,940,740 | 7/1990 | Folda et al. | 523/428 |
| 4,990,587 | 2/1991 | Shaw et al. | 528/113 |
| 5,025,045 | 6/1991 | Gawin et al. | 523/440 |
| 5,068,268 | 11/1991 | Dewhirst | 523/468 |
| 5,084,525 | 1/1992 | Akutagawa | 523/428 |
| 5,218,062 | 6/1993 | Earls | 525/524 |
| 5,244,719 | 9/1993 | Qureshi | 523/468 |

FOREIGN PATENT DOCUMENTS

| | | |
|---|---|---|
| 55-064584 | 5/1980 | Japan. |
| 33412 | 2/1988 | Japan 525/523 |

*Primary Examiner*—John C. Bleutge
*Assistant Examiner*—D. R. Wilson
*Attorney, Agent, or Firm*—Joanne W. Patterson

[57] ABSTRACT

Epoxy resin compositions having improved storage stability before curing and improved thermal and mechanical performance after curing comprise a mixture of a polyepoxide and a curing agent that is reactive with the polyepoxide. The epoxy resin composition is characterized by a glass transition temperature of less than 20° C., measured under standard conditions, after subjecting the epoxy resin composition to a specified thermal cycle. The preferred curing agents are aromatic diamines, for example, 3,7-diaminodibenzothiophene-5,5-dioxide; 3,7-diaminophenothiazine sulfone; 3,7-diamino-N-methylphenothiazine sulfone; 2,7-diamino-9-fluorenone and 2,4,6,8-tetramethyl-3,7-diaminothioxanthene sulfone.

18 Claims, 2 Drawing Sheets

EPOXY RESIN COMPOSITIONS WITH IMPROVED STORAGE STABILITY

FIELD OF THE INVENTION

This invention relates to curing agents for epoxy resin compositions.

BACKGROUND OF THE INVENTION

Epoxy resins currently used in the manufacture of high performance composites all tend to suffer from loss of tack, drape, and usability under conditions of ambient handling and storage due to chemical advancement, i.e., partial curing, of the resin. These epoxy compositions typically consist of a poly-O-glycidyl ether and/or poly-N-glycidyl amine, and an aromatic amine curing agent such as 3,3'-diaminodiphenyl sulfone, 4,4'-diaminodiphenyl sulfone or fluorenedianiline, and various other additives. These compositions are typically used in a hot melt process to form a prepreg. Hot melt processing may involve mixing, filming and prepregging at temperatures between 80° C. and 130° C. After hot melt processing these standard curing agents can react with the polyepoxide component even at low temperatures, especially in the presence of moisture. These reactions lead to limited out-time under conditions of ambient storage.

Out-time, which is a function of temperature and environment, is important in the construction of large and/or intricate parts where lay-up procedures can often exceed one month. For example, humidity is known to catalyze reactions in epoxy resin compositions at low temperatures. Systems that do not advance during the manufacture of parts provide better control of resin flow and therefore produce more homogeneous composites with better mechanical performance. Resistance to advancement also provides better product quality control.

Out-time is defined as the period over which tack, drape and usability are preserved by the resin composition (and products containing the resin composition such as prepreg) under defined environmental conditions. Tack is a subjective estimate of the ability of two resin-containing structures (such as prepreg) to stick together so that alignment is not easily disturbed. Should realignment be necessary, however, no damage is suffered to the objects upon removal and realignment. An example of such an alignment process is found in the lay-up procedure for carbon fiber-reinforced composite structures. Drape is the ability of a resin-containing structure (such as prepreg) to be bent and shaped without fracture or rebound of the uncured resin. Maintenance of tack and drape requires that resin advancement be kept to a minimum so that the glass transition of the resin does not exceed a critical level, which is typically about 20° C. "Usability" indicates that cured resin and composite properties are not deleteriously affected by conditions encountered prior to cure.

Epoxy resin compositions in which an aromatic amine curing agent becomes dissolved during mixing, filming and prepreg manufacture are described, for example, in U.S. Pat. No. 4,940,740. The preferred curing agents are 2,4'-, 4,4'- and 3,3'-diaminodiphenylmethane, 2,4'-, 4,4'-, and 3,3'-diaminodiphenyl sulfone, 2,2-bis(4-aminophenyl)propane and 2,2-bis(3-aminophenyl)propane. U.S. Pat. Nos. 4,330,659 and 4,500,582 disclose the use of the reaction product of diaminodiphenyl sulfone compounds and glycidyl ethers of polyhydric phenols as a hardener for epoxy resins. Storage stability of these resin compositions is poor under ambient, humid conditions. Resin compositions described as having improved storage stability are disclosed in U.S. Pat. No. 4,933,392, where compositions containing dicyandiamide (DICY) or polycarboxylic acid hydrazide are reported to be stable at 40° C. for up to 45 weeks. However, these curatives do not provide the thermal and mechanical properties attainable with aromatic amine curing agents, and at levels $\leq 10$ parts DICY per hundred parts polyepoxide tend to cause resin advancement problems during hot melt processing.

Aromatic diamines such as those disclosed in the present invention have been disclosed previously, although not their use as curing agents for epoxy resins. For example, U.S. Pat. No. 2,684,372 discloses the preparation of 2,7-diaminothioxanthone dioxide. JP 62-028792 discloses the preparation of 3,7-diaminodibenzothiophene-5,5-dioxide, which is said to be useful in preparing aromatic polyamides.

SUMMARY OF THE INVENTION

The composition of this invention comprises a mixture of (1) at least one polyepoxide and (2) from about 10 to about 100 parts per 100 parts polyepoxide of at least one crystalline curing agent that is reactive with the polyepoxide, the composition being characterized by a glass transition temperature of less than about 20° C. measured after storage under standard conditions after subjecting the composition to a specified thermal cycle.

Also according to the invention, the curing agent has a crystalline melting point (Tm) and heat of fusion $\Delta H_f$ satisfying the equation Tm greater than or equal to:

$$\left[ \frac{(-4.576 \text{ cal/mole } °K.)}{(\Delta H_f)} + 2.5 \times 10^{-3}/°K. \right]^{-1} \quad \text{(Equation 1)}$$

where $\Delta H_f$ is the heat of fusion in calories/mole and Tm is the melting point of the compound in °Kelvin.

Preferred curing agents are
3,7-diaminodibenzothiophene-5,5-dioxide;
3,7-diaminophenothiazine sulfone;
3,7-diamino-N-methylphenothiazine sulfone;
2,7-diamino-9-fluorenone and
2,4,6,8-tetramethyl-3,7-diaminothioxanthene sulfone.

Also according to the invention, these compositions can be used in the manufacture of prepregs and high performance composites.

The compositions have improved storage stability before curing and improved thermal and mechanical performance after curing.

DETAILED DESCRIPTION OF THE INVENTION

The polyepoxide component of the composition of this invention preferably has a glass transition temperature between −100° and 50° C. and provides tack to the prepregs made with the resin composition. A glass transition temperature between −100° and 20° C. is most preferred. The polyepoxide contains an average of more than one epoxide group per molecule and preferably at least two epoxide groups per molecule. Polyepoxide compounds and mixtures of polyepoxide compounds having between two and about four epoxide groups per molecule and a glass transition temperature below 5° C. are particularly preferred.

Epoxy compounds suitable for use in the preparation of epoxide resins include, for example, resorcinol diglycidyl ether, the diglycidyl ether of bisphenol A, the diglycidyl ether of bromobisphenol A, the diglycidyl ether of bisphenol F, triglycidyl aminophenol, tetraglycidyl methylenedianiline, polyglycidyl ethers of phenol-formaldehyde novolacs (e.g., DEN 431 and 438, supplied by Dow Chemical Co.), and the polyglycidyl ether of ortho-cresol novolac (e.g., ECN 1235 or 1273, supplied by Ciba Geigy); the diglycidyl ether of fluorene diphenol; the polyglycidyl ether of phenol-dicyclopentadiene novolacs (e.g., TACTIX 556, supplied by Dow Chemical Co.), the diglycidyl ether of butanediol, the diglycidyl ethers of propylene glycol (particularly tri- or tetra-(propylene glycol)di-(2,3-epoxypropyl)ethers and the tetraglycidyl amine of fluorenedianiline.

Combinations of two or more polyepoxide compounds can be used as the polyepoxide component. Preferred combinations include mixtures of polyepoxides comprising the diglycidyl ether of bisphenol F, resorcinol diglycidyl ether and the triglycidyl aminophenols or tetraglycidyl methylenedianiline, and mixtures of the triglycidyl aminophenols and the diglycidyl ether of butanediol or the diglycidyl ethers of propylene glycol, particularly tri- or tetra-(propylene glycol) di-(2,3-epoxypropyl)ethers. Particularly preferred are polyepoxide components that comprise aromatic polyepoxide compounds and one or more aromatic or aliphatic diepoxide compounds that have glass transition temperatures between −100° and about 50° C.

The curing agents used in the compositions of this invention provide improved out-time and provide storage stable compositions even in the presence of moisture. Epoxy resin compositions containing these curatives can be characterized by having a glass transition temperature of less than about 20° C. measured after at least 42 days storage at 80° F. (27° C.) and 65% relative humidity, subsequently referred to as "storage under standard conditions", after subjecting the epoxy resin composition to a thermal cycle comprising heating to 80° C. or 40 minutes followed by heating to 130° C. for 20 minutes, subsequently referred to as the "specified thermal cycle".

Figure 1:
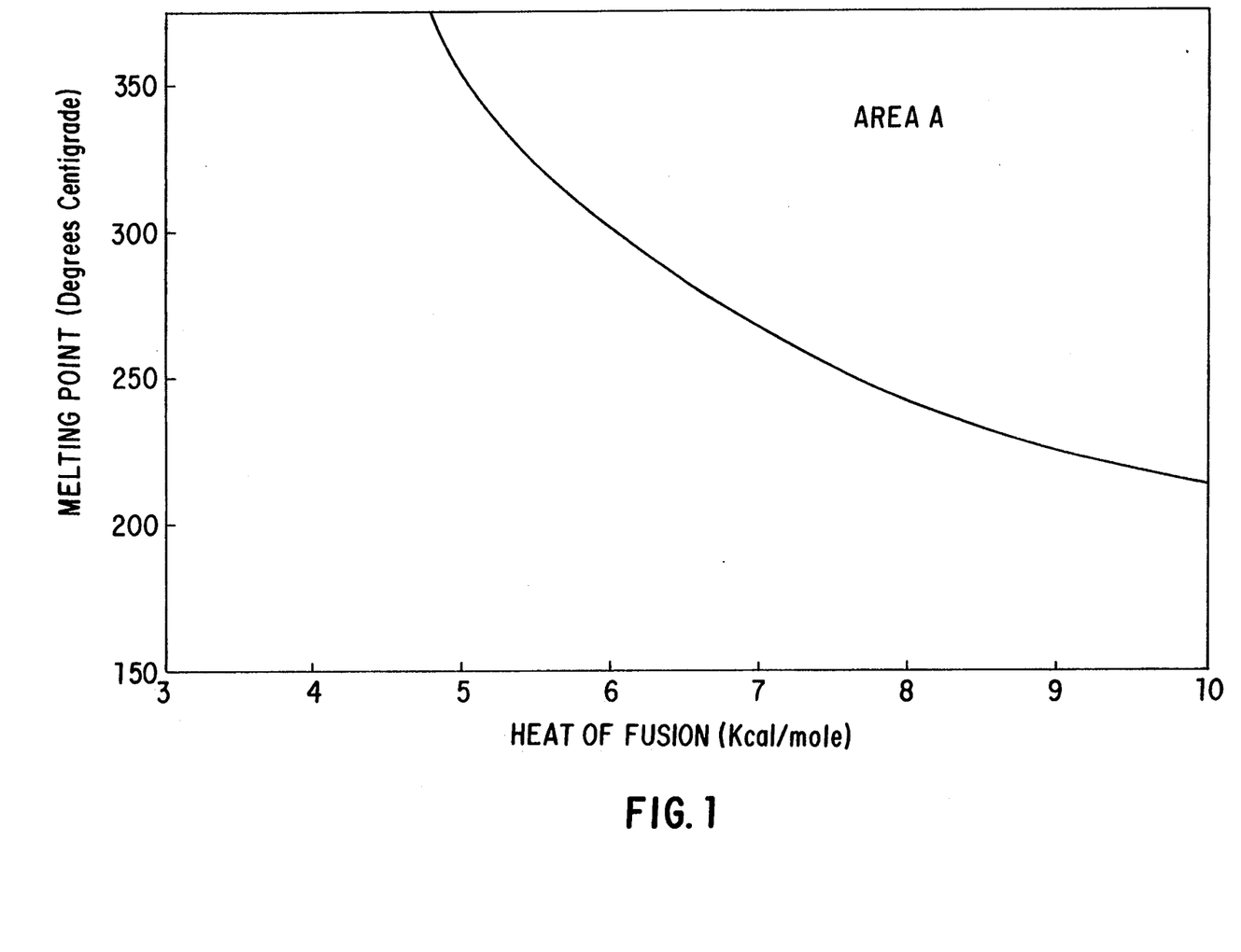
FIG. 1 shows the region of heat of fusion and melting point parameter pairs that identify curing agents that satisfy Equation 1 and provide improved resin storage stability (Area A).

The curing agents used in the compositions of this invention also have a crystalline melting point (Tm) and heat of fusion ($\Delta H_f$) satisfying the following relationship:

Tm greater than or equal to:

$$\left[ \frac{(-4.576 \text{ cal/mole }°K.)}{(\Delta H_f)} + 2.5 \times 10^{-3}/°K. \right]^{-1} \quad \text{(Equation 1)}$$

where $\Delta H_f$ is the heat of fusion in calories/mole and Tm is the melting point of the compound in °Kelvin. Area A in FIG. 1 is the region of heat of fusion and melting point parameter pairs that identify curatives that satisfy Equation 1 and provide improved resin storage stability.

The preferred curing agents are aromatic diamines, although other classes of compounds such as phenols, thiols, anhydrides, acids or any nucleophilic species having the required melting point and heat of fusion values will also provide extended out-time.

Most preferred are aromatic diamine curing agents having the general formula where X is a single carbon-carbon bond, $CH_2$, N—R (where R is phenyl, H, $CH_3$, or $CH_2CH_3$), C=O or $SO_2$ and Y is $CH_2$, N—R (where R is H, $CH_3$, $CH_2CH_3$ or phenyl), C=O, O, $SO_2$, SO, or S. Preferably, at least one of X and Y is an electron-withdrawing group, e.g., C=O or $SO_2$. Either or both of the aromatic rings can be substituted with groups other than primary amine groups, e.g., halogen, alkyl or aromatic groups, or unsubstituted. Specific examples of these compounds include

3,7-diaminodibenzothiophene-5,5-dioxide (DDTD),

3,7-diaminophenothiazine sulfone (DAP),

3,7-diamino-N-methylphenothiazine sulfone (DAMP), 3,7-diaminothioxanthenone-5,5-dioxide.

2,7-diamino-9-fluorenone (DAF)

2,4,6,8-tetramethyl-3,7-diaminothioxanthene sulfone (TMDATX)

DDTD, DAP, DAMP, DAF and TMDATX are preferred.

9,9-Bis(4'-aminophenyl)anthrone having the formula is an example of a compound that provides improved out-time and satisfies Equation 1, but is not described by the general formulas given above.

The crystalline curing agent is present in the composition in an amount sufficient to cure the composition, preferably in an amount of from about 10 to about 100 parts per 100 parts polyepoxide and in an amount that provides from 0.5 to 1.5 equivalents and more preferably from 0.8 to 1.2 equivalents of active hydrogen atoms per equivalent of epoxide groups in the composition.

Blends of the curing agents of this invention with curing agents that do not typically provide improved out-time in the polyepoxide can also be used, as long as the degree of resin advancement does not result in the glass transition temperature exceeding 20° C. within 42 days under standard conditions after exposure to 80° C. for at least 40 minutes and 130° C. for 20 minutes.

The curing agents of this invention have limited reaction with the polyepoxide in the composition, leading to substantially improved out-time compared to epoxy compositions containing diaminodiphenyl sulfone at comparable stoichiometry during very severe storage conditions, i.e., 80° F. (27° C.)/65% relative humidity. Improved out-time means that tack and drape are preserved for a longer period of time under these storage conditions, i.e., 80° F. (27° C.)/65% relative humidity.

The epoxy resin compositions can also contain particles that toughen the cured resin and/or the composite they are used in and are dispersed throughout the composition. These particles have a mean diameter of from 1 to 150 μm, preferably 10 to 75 μm. They can consist of, for example, rubbery polymers, glassy polymers, semicrystalline polymers, inorganic materials, metals and mixtures thereof. The polymeric particles can be crosslinked or thermoplastic in nature. The particles can take a variety of shapes including cylindrical, spherical, elliptical or platelet-like. The particles can have a lower, higher or identical dynamic shear storage modulus compared with that of the cured epoxy resin composition.

The epoxy resin composition can also contain high molecular weight or oligomeric polymers as tougheners. These polymers can be reactive or unreactive with the epoxy resin composition. The preferred polymers are polyamides, polyimides, polyesters, polycarbonates, polyethers, polysulfones, polyether sulfones and polyether sulfone/polythioether sulfones, and preferably contain sulfone bridges, diphenylene units or ketone-bridged diphenylene units. Other types of units that can be present in these preferred polymers are aromatic or cycloaliphatic units that are not bridged (e.g., naphthalene) or are bridged by groups that are essentially nonpolar, e.g., alkylidene such as isopropylidene groups. If a polymer that is reactive with the epoxy resin composition is used, the reactive groups are preferably terminal groups. Preferred reactive groups include, for example, amine, hydroxyl, thiol or epoxide groups.

Other ingredients such as catalysts, antioxidants, and processing aids can also be included in the epoxy resin composition in minor amounts. The cured resin composition can be single phase or multiphase.

The resin compositions of this invention are useful in applications where storage stability under ambient and humid conditions is desired. Cost savings are achieved by not having to store resin, or compositions containing the resin, at freezer temperature and low humidity. The epoxy compositions are particularly useful in making composites, where an epoxy resin composition containing a high strength filament is used to manufacture large and/or intricate structures. These structures may require extended periods during which the resin must remain stable and workable.

The epoxy resin compositions of this invention can be used in making prepregs by combining the composition with a reinforcing agent comprising a particulate filler or high strength filaments using conventional techniques known in the art. For example, the epoxy resin composition can be made into a film on release papers. Film carried by upper and lower release papers is then pressed into bands or sheets of high strength filaments. Alternatively, a "hot bead" process can be used, in which molten epoxy resin composition is pressed into bands or sheets of high strength filaments. Still another method comprises dispersing the epoxy resin composition in a solvent, passing the high strength filaments through a bath containing the dispersion, and then driving off the solvent. In this latter technique the bath is advantageously agitated to keep any undissolved components, including curing agent, dispersed.

High strength filaments used in making prepregs include carbon, aramid, and inorganic materials such as ceramic, boron and metal, and combinations thereof, preferably carbon or ceramic filaments. The filaments can be used in any form, including single fiber, chopped fiber, tows and woven cloth. "Particulate" reinforcing agents include spherical, irregular or ribbon-like particles as well as flakes and platelets. Suitable materials include glass, ceramic, mineral, organic and polymeric materials. Specific examples include mica, silica, quartz, carbon and poly(butylene terephthalate).

In the following examples, the dynamic mechanical evaluation was carried out as follows. The samples were cut into ~2.5"×0.375"×0.125" bars, which were tested on a Rheometrics Dynamic Mechanical Spectrometer (RMS605) at 10 radians per second. The temperature was increased at a rate of 10° C./min. from 20° C. to 350° C.

TΔG' was used as a measure of the thermal performance of the cured resin and was determined by the intersection of the straight lines drawn tangent to the G' vs. temperature plot (Rheometrics dynamic mechanical spectrum) before and after the glass transition temperature. G' is the dynamic shear storage modulus.

The heat of fusion ($\Delta H_f$) and melting point (Tm) were determined as follows. A sample of 0.5-2 mg was weighed into a differential scanning calorimeter (DSC) aluminum pan. The pan was always heated under nitrogen. If the melting point (Tm) had previously been determined via a melting point apparatus to be >250° C., the pan was sealed while in a nitrogen-purged glove box to prevent trapping air within the pan. The pan was placed into a TA Instruments 2100 Thermal Analysis System with a 2910 Differential Scanning Calorimeter under a nitrogen purge. The heating rate was 10° C./minute.

EXAMPLE 1

This example describes the preparation of 3,7-diaminophenothiazine sulfone (DAP).

Phenothiazine (30 g) was mixed in 800 ml glacial acetic acid in a round bottom flask. After sparging with nitrogen, 200 ml of fuming nitric acid were gradually added via pressure equalizing dropping funnel. The reaction temperature was moderated by the rate of addition and an ice bath. The flask was gradually warmed to room temperature while mixing. The mixture was filtered, washed with glacial acetic acid, washed with water, then dried in a 2 liter 3-neck flask under a nitrogen stream. The dried material (37 g) was mixed in 800 ml glacial acetic acid and 200 ml 30% hydrogen peroxide. The mixture was heated to reflux (103° C.) for 5 hours, then slowly cooled to room temperature under nitrogen. The reaction mixture was mixed with distilled water and the dinitro compound was filtered and washed with distilled water, followed by drying under vacuum overnight.

Figure 2:
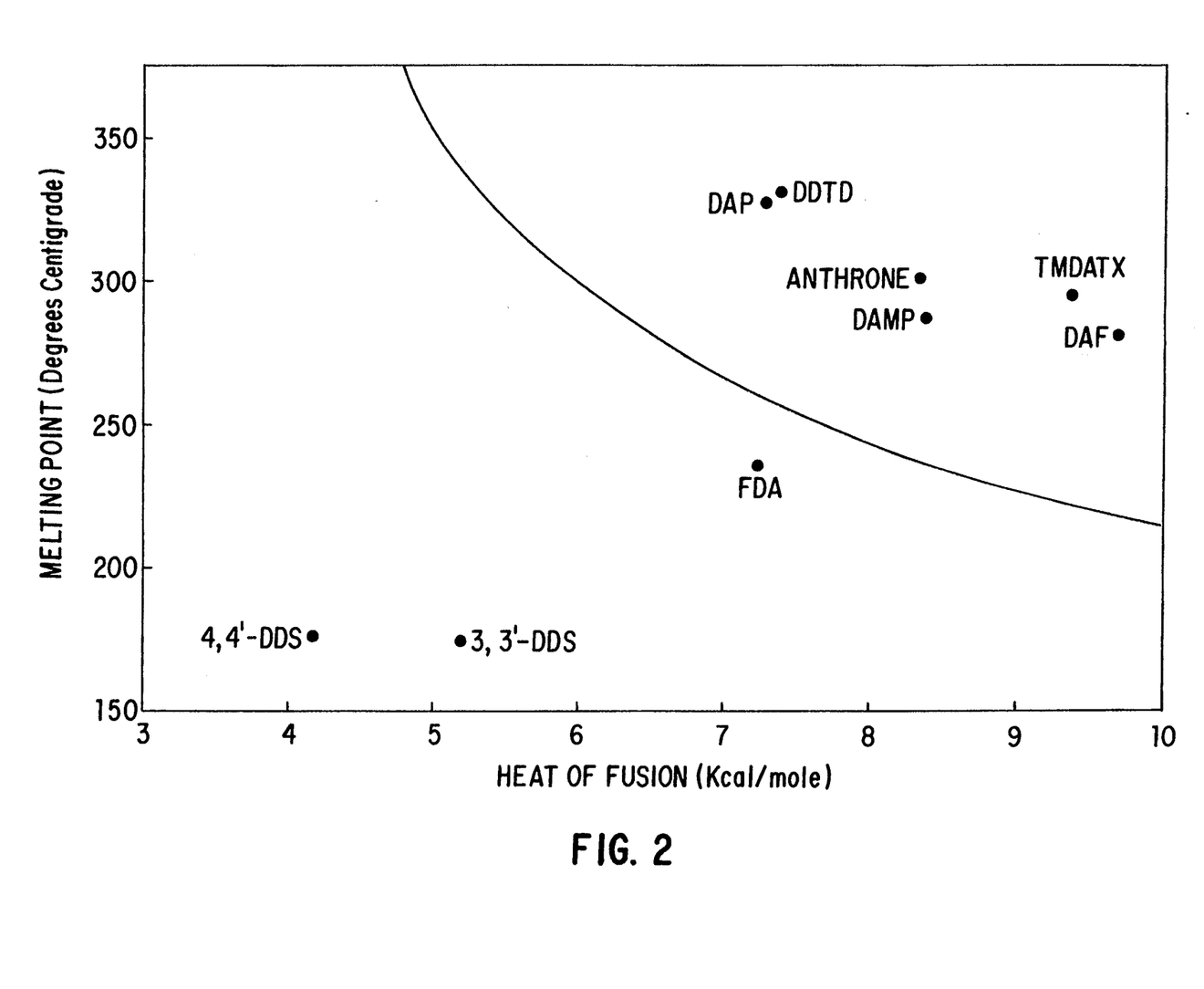
FIG. 2 shows the position of several of the curing agents of this invention and 3,3'- and 4,4'-diaminodiphenyl sulfone (DDS) with respect to the region described by Equation 1 and shown in FIG. 1.

The dinitro compound was slurried in 470 ml glacial acetic acid in a 1 l round bottom flask. A solution of 175 g $SnCl_2 \cdot 2H_2O$ in 207.5 ml concentrated HCl was added via a pressure equalized dropping funnel. After complete addition, the mixture was heated to 90° C. After heating at 90° C. for 1 hour, the mixture was slowly cooled to room temperature. The precipitate was filtered, washed with water, washed with glacial acetic acid and then washed with brine. The resulting white solid was slurried in water and made basic to a pH of 9.0 with aqueous KOH. The product was then washed with water, slurried with ethanol, filtered, washed with ethanol and dried. The diamino compound had a melting point (Tm) of 327° C. and a heat of fusion ($\Delta H_f$) of 7.3 Kcal/mole. The position of DAP with respect to that of 3,3'-diaminodiphenyl sulfone; 4,4'-diaminodiphenyl sulfone; 9,9-bis(4'-aminophenyl)fluorene (FDA) and the region described by Equation 1 is shown in FIG. 2.

EXAMPLE 2

This example describes the preparation of 3,7-diaminodibenzothiophene-5,5-dioxide (DDTD).

Concentrated sulfuric acid (875.0 ml, 97%) and 250.0 g dibenzothiophene sulfone (97%) were charged to a 5-liter jacketed glass reactor equipped with a mechanical stirrer and a cooling water condenser. When the dibenzothiophene sulfone was completely dissolved, 750.0 ml concentrated nitric acid (70%) was added dropwise to the reactor through a pressure equalizing addition funnel. The reactor temperature was controlled at 60° to 70° C. by the rate of addition. When the nitric acid addition was complete, the reaction mixture was heated to 90° C. by circulating hot oil through the reactor jacket and held there for 2.5 hours. The dinitro compound precipitated out of solution as it was being generated. The mixture was then cooled to room temperature.

The reaction mixture was added to water to dilute to a volume ratio of 1:4. The dinitro compound was filtered and washed with water until the pH of the filtrate was neutral. It was then dried to constant weight in a 120° C. vacuum oven. The dinitro intermediate (335 g, 95% yield) was obtained.

The dinitro intermediate (168.0 g) was dispersed in 2553.6 ml glacial acetic acid (99.8%) in a 5-liter jacketed glass reactor equipped with a mechanical stirrer and a cooling water condenser. In a separate vessel, 957.6 g tin(II) chloride dihydrate (98%) was dissolved in 1125.6 ml concentrated hydrochloric acid (37%). The tin(II) chloride solution was added slowly to the reactor through a pressure equalizing addition funnel. The reactor temperature was controlled at 60° to 70° C. by the rate of addition. When the tin(II) chloride addition was complete, the reaction mixture was heated to 90° C. by circulating hot oil through the reactor jacket and held there for 1.5 hours. The reactor content was a dispersion throughout the reaction. The mixture was then cooled to room temperature.

The reaction mixture was filtered and the wet cake was washed once with saturated sodium chloride solution and filtered. It was then dispersed in 3000 ml water, and 420 ml 20% aqueous sodium hydroxide solution were added to bring the pH to 12 to liberate the amine. The diamine was filtered and washed with water until the pH of the filtrate was neutral. It was then dried to constant weight in a 120° C. vacuum oven. The diamine (113 g) was obtained in 84% yield. The melting point and heat of fusion were determined to be 331.5° C. and 7.4 Kcal/mole, respectively, by differential scanning calorimetry (DSC). The position of DDTD with respect to that of 3,3'-diaminodiphenyl sulfone; 4,4'-diaminodiphenyl sulfone; 9,9-bis(4'-aminophenyl)fluorene and the region described in Equation 1 (Area A) is shown in FIG. 2.

EXAMPLE 3

This example describes the preparation of 3,7-diamino-N-methylphenothiazine sulfone (DAMP).

Under nitrogen, 40 g phenothiazine were dissolved in 400 ml dry tetrahydrofuran (THF). Butyllithium (132 ml, 1.6M) in hexane was added dropwise. The pot temperature was maintained below 10° C. by a controlled rate of addition and an ice bath. As the butyllithium was added, a white precipitate formed. After 1.5 hours, 5.0 ml butyllithium in hexane were added. The reaction mixture was allowed to warm to room temperature.

Stirring was continued at room temperature for 30 minutes. The reaction mixture was then chilled in an ice bath and 14 ml methyl iodide were added in portions via syringe. With each small addition, a small exotherm was noted. After complete addition, the reaction mixture was allowed to warm to room temperature. Isopropyl alcohol (5.0 ml) was added and no exotherm was recorded. The reaction mixture was extracted with water in a separatory funnel. The aqueous layer was extracted twice with ether and combined with the THF layer. The organic layer was dried overnight over $MgSO_4$.

The reaction mixture was then filtered and stripped of solvent to a weight of 43.92 g to yield a tan crystalline solid. The crystalline mass was slurried in methanol and filtered to obtain 39.96 g white crystalline solid. This crystalline solid was slurried in 375.5 ml glacial acetic acid to which was added 94 ml 90% $HNO_3$ dropwise via pressure equalized dropping funnel. The pot temperature was maintained at 40° C. by adjusting the rate of addition and an ice bath. After completion of addition, the reaction mixture was stirred for 5 minutes at 35° C. The reaction mixture was poured into 1 l water to precipitate the product. The product was filtered and mixed with 300 ml glacial acetic acid, which was subsequently poured into 1 l water. This mixture was filtered to produce a yellow solid. The yellow solid was washed with water, then ethanol, then dried to produce 21.89 g of product. The dry solid was mixed with 300 ml glacial acetic acid and 150 ml 30% hydrogen peroxide. This mixture was heated to reflux for 2.5 hours. After 2.5 hours, 78 ml fresh hydrogen peroxide were added and reflux continued for an additional 1.5 hours. After cooling to room temperature, a crystalline solid precipitated. The precipitate was filtered, washed with cold glacial acetic acid, water, then ethanol. The filter cake was dried to produce 19.27 g of dinitro compound.

The dinitro compound was slurried under nitrogen in 312 ml glacial acetic acid. $SnCl_2 \cdot 2H_2O$ (116.0 g) in 138 ml concentrated HCl was added to the pot via a pressure equalizing dropping funnel. The temperature of the pot slowly increased from room temperature to 37° C. over 40 minutes. When the pot temperature began to drop, the pot was heated to 90° C. and held at that temperature for 30 minutes. After cooling to room temperature, the solids were collected by filtration, washed with glacial acetic acid, then transferred to an 800 ml flask. Approximately 250 ml water were added to the flask and the solids were slurried. The pH was adjusted to 9 with aqueous KOH. The slurry was filtered and washed once with ethanol. The solid was dried under vacuum at 50° C. for 4.5 hours.

The product had a Tm of 287° C. and a heat fusion of 8.4 Kcal/mole. The position of DAMP with respect to that of 3,3-diaminodiphenyl sulfone; 4,4,-diaminodiphenyl sulfone; 9,9-bis(4'-aminophenyl)fluorene and the region described by Equation 1 (Area A) is shown in FIG. 2.

EXAMPLE 4

This example describes the preparation of 2,7-diamino-9-fluorenone (DAF).

2,7-Dinitro-9-fluorenone (13.33 g) and 69.93 g of glacial acetic acid were added to a 250 ml three neck round bottom flask equipped with a mechanical stirrer, water-cooled condenser, pressure equalizing addition funnel, and nitrogen inlet and outlet. While purging with nitrogen through the flask, a solution of 90.47 g of tin chloride dihydrate and 88.8 g of concentrated hydrochloric acid (37%) was added through the addition funnel at room temperature. When half of the tin chloride had been added to the reactor, the reactor was immersed in an oil bath and heated to approximately 60° C. An exotherm was observed and the reactor temperature peaked at 73° C. When the exotherm had subsided, the second half of the tin chloride solution was added. The reactor contents were then heated to approximately 107° C. for 2.5 hours. After cooling to room temperature, the crude product was filtered using a sintered glass funnel. The wet cake was washed with 200 ml of concentrated hydrochloric acid and then cold water until the filtrate had just turned purple. The wet cake was dissolved in water, and a 20% aqueous sodium hydroxide solution was added to precipitate the free diamine. The diamine was filtered and washed with water until neutral. The diamine was then dried in a 100° C. vacuum oven. The melting point and heat of fusion were 281° C. and 9.7 Kcal/mole respectively. The position of DAF with respect to that of 3,3'-diaminodiphenyl sulfone, 4,4'-diaminodiphenyl sulfone, 9,9-bis(4'-aminophenyl)fluorene and the region described by Equation 1 (Area A) is shown in FIG. 2.

EXAMPLE 5

This example describes the preparation of 2,4,6,8-tetramethyl-3,7-diaminothioxanthene sulfone (TMDATX).

A 1000 ml 3 neck round bottom flask was equipped with a mechanical stirrer and a thermometer, then charged with 440 g of fuming sulfuric acid (27–33% free $SO_3$). Tetramethylmethylenedianiline (44.0 g) was slowly added to the flask. This reaction mixture was then stirred for 5 hours at 25°–27° C. The reaction mixture was then added slowly to crushed wet ice. Sodium hydroxide pellets (378 g) were added slowly to this mixture. Ice was also added as needed to moderate temperature. Solids were collected by filtration. The solids were washed, slurried and filtered twice with water, and air dried overnight, followed by heating at 100° C. under vacuum for 1 hour. The melting point and heat of fusion were 295° C. and 9.4 Kcal/mole respectively. The position of TMDATX with respect to that of 3,3'-diaminodiphenyl sulfone, 4,4'-diaminodiphenyl sulfone, 9,9-bis(4'-aminophenyl)fluorene and the region described by Equation 1 (Area A) is shown in FIG. 2.

Comparative Example 1

The triglycidyl ether of 4-aminophenol and the diglycidyl ether of bisphenol F (10.46 g each) were weighed into a 400 ml beaker, which was then immersed into an oil bath at 130° C. A phenol-terminated polyarylether sulfone oligomer (8.72 g) was added while mixing with a three blade stainless steel propeller. The contents of the beaker were mixed until the polyarylether sulfone oligomer had fully dissolved. 3,3'-Diaminodiphenyl sulfone (10.37 g) was added to the beaker while mixing. After mixing until uniform, the beaker was removed from the oil bath and heated in a vacuum oven to 150° C. under vacuum to dissolve the 3,3'-diaminodiphenyl sulfone and degas the resin mixture. The liquid resin mixture was then transferred to a 6"×6"×0.125" aluminum sheet mold that had been preheated to 150° C. The mold was then placed in an oven at 150° C., ramped at 2° C./min. to 180° C., held at 180° C. for 2 hours, then cooled slowly to room temperature. A 2.5"×0.375"×0.125" rectangular prism was cut from the cured sheet. A T∆G' of 180° C. was measured in a Rheometrics Mechanical Spectrometer. The dynamic shear storage modulus was 1.98 GPa at room temperature.

The phenol-terminated polyarylether sulfone oligomer used in this example was prepared by adding 7143 ml dimethylacetamide, 2250 g VICTREX 4100G (an aromatic polysulfone supplied by ICI) and 67.5 g KOH to a 12 liter flask. The mixture was heated to 145° C. for four hours, followed by slow cooling to room temperature. Acetic acid (86.8 g) was added to the reactor when the temperature of the contents reached 86° C. The mixture was coagulated in water, filtered, washed repeatedly with water, then dried.

EXAMPLE 6

The triglycidyl ether of 4-aminophenol (2.62 g), the diglycidyl ether of bisphenol F (2.62 g) and 2.18 g phenol-terminated polyarylether sulfone were weighed into a 125 ml beaker. The polyarylether sulfone was prepared as described in Comparative Example 1. The beaker was then immersed in an oil bath at 130° C., equipped with a three blade stainless steel propeller, and mixing initiated. Mixing was continued for 30 minutes until the oligomer had fully dissolved. 3,7-Diaminodibenzothiophene-5,5-dioxide (2.58 g), prepared as described in Example 2, was added to the resin at 130° C. After mixing until uniform, the mixture was placed in a vacuum oven at 170° C. to degas. The material was then used to fill 3 (2.5"×0.5×0.125") open face mold cavities. The mold was then placed in an autoclave at 100 psi and cured at 2° C./min up to 200° C. followed by a hold of 2 hours at 200° C. The cured bars were evaluated in a Rheometrics Mechanical Spectrometer. The TΔG' is 221° C. while the dynamic shear storage modulus is 2.00 GPa at room temperature.

Comparative Example 2

The triglycidyl ether of 4-aminophenol (173.5 g), 34.7 g of the diglycidyl ether of bisphenol F, 152.7 g phenol-terminated polyarylether sulfone oligomer, 115.7 g methyl ethyl ketone (MEK), and 148.6 g of an 18% by weight solution of HYCAR 1472 in MEK were combined in a one liter resin kettle. The polyarylether sulfone oligomer was prepared as described in Comparative Example 1. HYCAR 1472 is a carboxylated polybutadiene/acrylonitrile rubber supplied by B. F. Goodrich. MEK was vacuum stripped while mixing and heating to 120° C. The resin mixture was quenched with dry ice and stored in a freezer and is referred to as resin EX7A.

Resin EX7A (22.62 g) was weighed into a 150 ml beaker. The beaker was immersed in an 80° C. oil bath. After 10 minutes a three blade mechanical stirrer was immersed in the resin. The resin mixture was mixed for 10 minutes, after which 7.38 g 3,3'-diaminodiphenyl sulfone (3,3'-DDS) were added. This resin mixture was stirred for 20 minutes. The beaker was then removed from the oil bath and its contents stored in a freezer.

Approximately 10 g of the resin mixture were warmed to room temperature, then placed on a piece of release paper which had been taped to a metal plate heated to 130° C. The resin sample/release paper/metal plate was then placed in a 30° C. oven for 12 minutes. A Mayer rod, which had been preheated to 130° C., was used to draw down the resin into a thin film. The film was removed from the block and allowed to cool to room temperature. The film on the release paper was returned to the oven at 130° C. for two minutes. The film was removed from the oven and placed in an 80° F. (27° C.)/65% relative humidity environmental chamber. Samples were taken at appropriate intervals. The Tg of the resin mixture as determined by differential scanning calorimetry (DSC) as a function of storage time is recorded in Table 1.

EXAMPLE 7

The resin EX7A mixture (22.66 g), prepared as described in Comparative Example 2, was weighed into a 150 ml beaker. The beaker was immersed in a 130° C. oil bath. After 5 minutes a three blade mechanical stirrer was immersed in the resin. The resin mixture was mixed for 10 minutes, after which 7.34 g 3,7-diaminodibenzothiophene-5,5-dioxide (DDTD), prepared as described in Example 2, were added slowly over a 40 minute period. The beaker was then removed from the oil bath and its contents stored in a freezer.

Approximately 10 g of the resin mixture were warmed to room temperature, then placed on a piece of release paper that had been taped to a metal plate heated to 130° C. The resin sample/release paper/metal plate was placed in a 130° C. oven for 12 minutes. A Mayer rod, which had been preheated to 130° C., was used to draw down the resin into a thin film. The film was removed from the block and allowed to cool to room temperature. The film was then placed in an 80° F, (27° C.)/65% relative humidity environmental chamber. Samples were taken at appropriate intervals. The Tg of the resin mixture as a function of storage time is recorded in Table 1.

TABLE 1

| | Tg as a Function of Storage Time at 80° F. (27° C.) and 65% Relative Humidity | |
|---|---|---|
| Days @ 80° F. (27° C.)/65% RH | 3,3'-DDS Resin Tg (°C.) Comparative Example 2 | DDTD Resin Tg (°C.) Example 7 |
| 0 | 14 | 12.6 |
| 2 | 14 | 9.6 |
| 5 | 17.9 | 6.4 |
| 7 | 22.3 | 6.3 |
| 9 | 27.4 | 6.5 |
| 12 | 33.2 | 4.25 |
| 16 | 47.3 | 13.5 |
| 23 | 57.7 | 13 |
| 30 | 61.2 | 12.6 |
| 42 | 66.8 | 12.5 |

EXAMPLE 8

The tetraglycidyl amine of methylenedianiline (4.30 g) and the triglycidyl ether of 4-aminophenol (4.30 g) were weighed into a 50 ml beaker. VICTREX 5003P, an aromatic polysulfone supplied by ICI (2.58 g), was also weighed into the beaker. The beaker was put into a 130° C. oil bath and the sample was mixed with an electric stirrer using a 2-blade propeller. After about 30 minutes, the VICTREX had dissolved. 3,7-Diaminodibenzothiophene-5,5-dioxide (DDTD), prepared as described in Example 2, was ground up in a blender and was sifted through a 300 mesh sieve prior to use. The DDTD was slowly added to the sample with stirring over a 50 minute period. The sample was stirred for 10–15 minutes after the last of the DDTD had been added. The beaker was removed from the oil bath, cooled to room temperature and stored in a freezer overnight.

The beaker was put into a 170° C. oven and warmed for ten minutes before a vacuum was applied. The sample was degassed for about 30 minutes. The sample was removed from the oven and was scooped out of the beaker with a spatula that had been heated in the 170° oven. The sample was transferred to two open face bar mold cavities with dimensions of 2.5"×0.5"×0.125". The open face mold had also been preheated to 170° C. to allow the sample to fill the mold without trapping air. The filled mold was cooled to room temperature and then placed in an autoclave. The temperature was raised at 2° C./minute up to 220° C. and was held there for 2 hours. The autoclave was slowly cooled to room temperature. The sample was cured under 100 psi nitrogen. A Rheometrics Mechanical Spectrometer was used to analyze one of the 2.5"×0.5"×0.125" prisms. The sample exhibited a minor T$\Delta$G' at 210° C. with a second transition at 270° C. The dynamic shear storage modulus was 1.96 GPa at room temperature.

EXAMPLE 9

The triglycidyl ether of 4-aminophenol and the tetraglycidyl amine of methylenedianiline (140.8 g each) were weighed into a clean, dry 600 ml beaker. The beaker was immersed in an oil bath at 125° C. and equipped with a three-blade stainless steel propeller. These resins were mixed for 15 minutes at 125° C. While mixing, 84.5 g VICTREX 5003P were added. Mixing was continued for 2 hours at 125° C., after which the resin mixture was cooled to room temperature and stored in a polyethylene bag in a freezer. This resin mixture is referred to as EX13-1A.

Resin EX13-1A (7.83 g) was weighed into a 30 ml beaker. The beaker was put into a 130° C. oil bath and the sample was mixed with an electric stirrer using a 2-blade propeller. 3,7-diaminophenothiazine sulfone (DAP), prepared as described in Example 1, was sifted through a 325 mesh sieve prior to use. Sifted DAP (3.01 g) was added to the stirring premix. Addition of the DAP took about 5 minutes. The sample was stirred for another 15 minutes in the oil bath. The sample was then scooped out into a 2.5"×0.5"×0.125" open face bar mold. The mold had been preheated to 130° C. to allow the sample to flow easily without trapping air. The filled mold was put into a 130° C. oven under vacuum for about 15 minutes to remove trapped air from the sample. The mold was cooled to room temperature on the bench top and put into an autoclave. The temperature was increased at a rate of 2° C./minute to 200° C. and held there for two hours, then slowly cooled to room temperature. The entire cure was done under 100 psi nitrogen. The sample exhibited a minor T$\Delta$G' at 170° C. with a second transition at 270° C. The dynamic shear storage modulus at room temperature was 1.99 GPa.

EXAMPLE 10

Resin EX13-1A (6.73 g), prepared as described in Example 9, was weighed into a 30 ml beaker. The beaker was put into a 130° C. oil bath and the resin was stirred with a 2-blade propeller with an electric mixer. 3,7-Diamino-N-methylphenothiazine sulfone (DAMP), prepared as described in Example 3, was sifted through a 300 mesh sieve prior to use. The DAMP (2.73 g) was added to the stirred premix over a five minute period. The sample was stirred for another five minutes to make sure a good dispersion was obtained. The sample was removed from the oil bath and was scooped out into a 2.5"×0.5"×0.125" open face bar mold. The bar mold had been preheated to 130° C. to allow the sample to flow and fill it without trapping air. The filled bar mold was put back into a 130° C. oven under vacuum for about 15 minutes to degas the sample. The mold was removed from the oven and was allowed to cool to room temperature. The cure was the same as that described in Example 9. The Rheometrics Mechanical Spectrometer was used to determine T$\Delta$G' and the dynamic shear storage modulus. T$\Delta$G' was 197° C. and the dynamic shear storage modulus was 1.85 GPa at room temperature.

Comparative Example 3

The triglycidyl ether of 4-aminophenol and the tetraglycidyl amine of methylenedianiline (140.8 g each) were weighed into a clean, dry 600 ml beaker. The beaker was immersed in an oil bath at 125° C. and equipped with a three-blade stainless steel propeller. These resins were mixed for 15 minutes at 125° C. and 84.5 g VICTREX 5003P were then added with mixing. Mixing was continued for 2 hours at 125° C., after which the resin mixture was cooled to room temperature and stored in a polyethylene bag in a freezer. This resin mixture is referred to as resin EX13-1A.

Resin EX13-1A (29.27 g) was weighed into a 100 ml beaker that was immersed in an 80° C. oil bath. 3,3'-Diaminodiphenyl sulfone (3,3'-DDS) and 1.09 g 4,4'-DDS were added to the beaker while mixing at 80° C. over a 30–40 minute period. About 5 g of this mixture was spread across the top of a piece of release paper. The paper was put into an oven at 130° C. for 20 minutes. The paper was then taped onto a large metal block that had been preheated to 130° C. A Mayer rod, also preheated to 130° C., was used to draw down the sample into a thin film. The paper was cut off of the hot metal block and allowed to cool to room temperature. After cooling the film was aged in an environmental chamber at 80° F. and 65% relative humidity. Tg (°C.) was measured at 0, 7, 17, 23, 30 and 42 days. The results are given in Table 2.

EXAMPLE 11

Resin EX13-1A (11.14 g), prepared as described in Example 9, was mixed with 4.05 g 3,7-diaminodibenzothiophene-5,5-dioxide (DDTD), prepared as described in Example 2, at 80° C. The DDTD was slowly added over a 30–40 minute period. After the 40 minute period, 5.6 g of this resin mixture were spread across the top of a sheet of release paper as described in Comparative Example 3. Results of the Tg measurements are given in Table 2.

EXAMPLE 12

Resin EX13-1A (5.06 g), prepared as described in Example 9, and 1.954 g 3,7-diaminophenothiazine sulfone (DAP) were combined as in Example 11. A film was made as described in Comparative Example 3. Results of the Tg measurements are given in Table 2.

EXAMPLE 13

Resin EX13-1A (5.15 g), prepared as described in Example 9, and 2.096 g 3,7-diamino-N-methylphenothiazine sulfone (DAMP) were combined as in Example 11. A film was prepared as described in Comparative Example 3. Results of the Tg measurements are given in Table 2.

EXAMPLE 14

Resin EX13-1A (7.51 g), prepared as described in Example 9, and 4.17 g 9,9-bis(4'-aminophenyl)anthrone (designated as "anthrone" in the table) were combined as in Example 11. A film was prepared as described in Comparative Example 3. The results of the Tg measurements are given in Table 2.

Comparative Example 4

Resin EX13-1A (8.03 g), prepared as described in Example 9, and 4.14 g 9,9-bis(4'-aminophenyl)fluorene (FDA) were combined as in Example 11. A film was prepared as described in Comparative Example 3. The results of the Tg measurements are given in Table 2.

EXAMPLE 15

Resin EX13-1A (6.20 g) and 2.90 g of TMDATX, prepared as in Example 5, were combined as described in Example 11. The TMDATX had been recrystallized from acetone, then sifted through a 325 mesh sieve. A film was prepared as described in Comparative Example 3. The results of the Tg measurements are given in Table 2.

EXAMPLE 16

Resin EX13-1A (20.87 g) and 6.48 g of 2,7-diamino-9-fluorenone (DAF), prepared as described in Example 4, were combined as in Example 11. The DAF had been sifted through a 325 mesh sieve. A film was prepared as described in Comparative Example 3. The results of the Tg measurements are given in Table 2.

TABLE 2

| Days at 80° F. (27° C.) and 65% RH | Control (DDS) Tg (°C.) Comp. Ex. 3 | Control (FDA) Tg (°C.) Comp. Ex. 4 | DAP Tg (°C.) Ex. 12 | DDTD Tg (°C.) Ex. 11 | DAMP Tg (°C.) Ex. 13 | Anthrone Tg (°C.) Ex. 14 | (DAF) Tg (°C.) Ex. 16 | TMDATX Tg (°C.) Ex. 15 |
|---|---|---|---|---|---|---|---|---|
| 0 | 0.2 | 4.8 | −5.2 | −10.9 | −8.5 | −2.3 | −12.7 | −11.2 |
| 7 | 4.3 | 34.9 | −6.9 | −11.4 | −12.7 | −1.3 | −14.3 | −13.8 |
| 16 | 18.2 | 46.4 | −2.4 | −11.2 | −11.6 | 0.4 | | −11.6 (day 19) |
| 23 | 36.9 | | 4.0 | −12.9 | −7.7 | 6.9 | | −12.7 |
| 30 | 48.2 | | 5.9 | −9.1 | −8.0 | 10.0 | −9.1 | |
| 42 | 56.0 | | 7.4 | −8.8 | −3.09 | 16.2 | −9.4 | −11.9 (day 48) |
| 73 | | | | −7.2 | 7.2 | | | |
| 114 | | | | −3.3 | | | | |

We claim:

1. A composition comprising a mixture of
   (1) at least one polyepoxide having an average of more than one epoxide group per molecule selected from the group consisting of polyglycidyl ethers and polyglycidyl amines and
   (2) from about 10 to about 100 parts per 100 parts polyepoxide of at least one crystalline aromatic diamine curing agent that is reactive with the polyepoxide and is selected from the group consisting of 3,7-diaminodibenzothiophene-5,5-dioxide; 3,7-diaminophenothiazine sulfone; 3,7-diamino-N-methylphenothiazine sulfone: 2,7-diamino-9-fluorenone and 2,4,6,8-tetramethyl-3,7-diaminothioxanthene sulfone.

2. The composition of claim 1 wherein the curing agent is present in an amount providing from 0.5 to 1.5 equivalents of active hydrogen atoms per equivalent of epoxide groups in the composition.

3. The composition of claim 2 wherein the curing agent is present in an amount of 0.8 to 1.2 equivalents of active hydrogen atoms per equivalent of epoxide groups in the composition.

4. A prepreg comprising the composition of claim 1 and a reinforcing agent.

5. The prepreg of claim 4 wherein the reinforcing agent is selected from the group consisting of carbon, aramid and inorganic fibers; glass, ceramic, mineral, organic and polymeric particulates, and mixtures thereof.

6. The prepreg of claim 5 wherein the reinforcing agent is carbon fiber.

7. The prepreg of claim 5 wherein the reinforcing agent is ceramic fiber.

8. The prepreg of claim 4 wherein the curing agent is present in an amount providing from 0.5 to 1.5 equivalents of active hydrogen atoms per equivalent of epoxide groups in the composition.

9. The prepreg of claim 8 wherein the curing agent is present in an amount providing from 0.8 to 1.2 equivalents of active hydrogen atoms per equivalent of epoxide groups in the composition.

10. A composite comprising the cured composition of claim 1 and a reinforcing agent.

11. The composite of claim 10 wherein the reinforcing agent is selected from the group consisting of carbon, aramid and inorganic fibers; glass, ceramic, mineral, organic and polymeric particulates; and mixtures thereof.

12. The composite of claim 11 wherein the reinforcing agent is carbon fiber.

13. The composite of claim 11 wherein the reinforcing agent is ceramic fiber.

14. The composite of claim 10 wherein the curing agent is present in an amount providing from 0.5 to 1.5 equivalents of active hydrogen atoms per equivalent of epoxide groups in the composition.

15. The composite of claim 14 wherein the curing agent is present in an amount providing from 0.8 to 1.2 equivalents of active hydrogen atoms per equivalent of epoxide groups in the composition.

16. A process for improving the out-time of compositions comprising a mixture of at least one polyepoxide and at least one curing agent, the process comprising mixing a polyepoxide having an average of more than one epoxide group per molecule selected from the group consisting of polyglycidyl ethers and polyglycidyl amines with from about 10 to about 100 parts per 100 parts polyepoxide of at least one crystalline aromatic diamine curing agent that is reactive with the polyepoxide and is selected from the group consisting of 3,7-diaminodibenzothiophene-5,5-dioxide; 3,7- diaminophenothiazine sulfone; 3,7-diamino-N-methylphenothiazine sulfone; 2,7-diamino-9-fluorenone and 2,4,6,8-tetramethyl-3,7-diaminothioxanthene sulfone.

17. The process of claim 16 wherein the curing agent is present in an amount providing from 0.5 to 1.5 equivalents of active hydrogen atoms per equivalent of epoxide groups in the composition.

18. The process of claim 17 wherein the curing agent is present in an amount providing from 0.8 to 1.2 equivalents of active hydrogen per equivalent of epoxide groups in the composition.

* * * * *